(12) United States Patent
Beltrame et al.

(10) Patent No.: US 11,773,280 B2
(45) Date of Patent: *Oct. 3, 2023

(54) INK COMPOSITION FOR INKJET PRINTING

(71) Applicant: Domino Printing Sciences Plc, Cambridge (GB)

(72) Inventors: Emanuela Morgan Beltrame, Cambridge (GB); Mary Thomson, Cambridge (GB)

(73) Assignee: Domino Printing Sciences PLC, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/042,531

(22) PCT Filed: Mar. 28, 2019

(86) PCT No.: PCT/EP2019/057873
§ 371 (c)(1),
(2) Date: Sep. 28, 2020

(87) PCT Pub. No.: WO2019/185804
PCT Pub. Date: Oct. 3, 2019

(65) Prior Publication Data
US 2021/0009838 A1 Jan. 14, 2021

(30) Foreign Application Priority Data
Mar. 28, 2018 (GB) .................................. 1804959

(51) Int. Cl.
*C09D 11/38* (2014.01)
*B41M 5/00* (2006.01)
(Continued)

(52) U.S. Cl.
CPC ............... *C09D 11/38* (2013.01); *B41J 2/01* (2013.01); *B41J 2/2107* (2013.01);
(Continued)

(58) Field of Classification Search
CPC ......... C09D 11/36; C09D 11/40; C09D 11/30; C09D 11/38; C09D 11/32; C09D 11/322;
(Continued)

(56) References Cited

U.S. PATENT DOCUMENTS 6,010,564 A 1/2000 Zhu et al.
6,140,391 A 10/2000 Zou et al.
(Continued)

FOREIGN PATENT DOCUMENTS

CN 101180373 A 5/2008
CN 104231746 A 12/2014
(Continued)

OTHER PUBLICATIONS

Search Report dated Jul. 24, 2018 issued in Application No. GB1804959.3.
(Continued)

*Primary Examiner* — Manish S Shah
(74) *Attorney, Agent, or Firm* — Stites & Harbison PLLC; Richard S. Myers, Jr.

(57) ABSTRACT

This application relates to an ink composition, in particular an ink composition for use in continuous inkjet printing. The ink composition for use in continuous inkjet printing, contains a siloxane surfactant and a metal conductivity salt. The ink composition is suitable for producing printed images with good adhesion to low surface energy substrates, in particular, low energy substrates such as polypropylene, LDPE and HDPE. The ink composition has a liquid carrier, a colourant, a siloxane surfactant and a metal conductivity
(Continued)

salt. The siloxane surfactant is present in an amount greater than 0.1% by weight of the ink composition.

15 Claims, 1 Drawing Sheet

(51) Int. Cl.
*B41M 5/50* (2006.01)
*C09D 11/102* (2014.01)
*C09D 11/324* (2014.01)
*C09D 11/03* (2014.01)
*C09D 11/10* (2014.01)
*C09D 11/36* (2014.01)
*C09D 11/52* (2014.01)
*C08K 3/105* (2018.01)
*C08K 3/32* (2006.01)
*B41J 2/21* (2006.01)
*B41J 2/01* (2006.01)

(52) U.S. Cl.
CPC .......... *B41M 5/0023* (2013.01); *B41M 5/502* (2013.01); *C09D 11/03* (2013.01); *C09D 11/10* (2013.01); *C09D 11/102* (2013.01); *C09D 11/324* (2013.01); *C09D 11/36* (2013.01); *C09D 11/52* (2013.01); *C08K 3/105* (2018.01); *C08K 2003/324* (2013.01)

(58) Field of Classification Search
CPC ... C09D 11/324; C09D 11/328; C09D 11/101; C09D 11/102; C09D 11/005; C09D 11/54; C09D 11/52; C09D 11/106; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 3/4078; B41J 11/0021; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436
See application file for complete search history.

(56) References Cited

U.S. PATENT DOCUMENTS

| | | | |
|---|---|---|---|
| 6,203,605 B1 | 3/2001 | Thakkar et al. | |
| 6,350,795 B1* | 2/2002 | Breton | C09D 11/34 524/211 |
| 6,726,756 B1 | 4/2004 | Zou et al. | |
| 7,432,316 B2 | 10/2008 | Elmer et al. | |
| 2004/0110868 A1 | 6/2004 | Zhu et al. | |
| 2004/0154495 A1* | 8/2004 | Zhu | C09D 11/36 106/31.86 |
| 2007/0248838 A1 | 10/2007 | Marken-Imaje | |
| 2008/0193725 A1* | 8/2008 | De Saint-Romain | C09D 11/30 106/31.28 |
| 2009/0197055 A1* | 8/2009 | Yokoi | C09D 11/30 427/256 |
| 2009/0246377 A1* | 10/2009 | Robertson | C09D 11/328 106/31.77 |
| 2010/0020148 A1* | 1/2010 | Gervasi | B41J 13/076 347/99 |
| 2010/0028632 A1* | 2/2010 | Goustiaux | C09D 11/38 428/209 |
| 2011/0242191 A1* | 10/2011 | Mochizuki | C09D 11/30 524/502 |
| 2012/0013677 A1* | 1/2012 | Robertson | C09D 11/38 524/379 |
| 2013/0260037 A1 | 10/2013 | Paiz et al. | |
| 2014/0204156 A1 | 7/2014 | Gotou | |
| 2014/0038585 A1 | 12/2014 | Li et al. | |
| 2014/0378585 A1 | 12/2014 | Li et al. | |

FOREIGN PATENT DOCUMENTS

| | | |
|---|---|---|
| CN | 104277578 A | 1/2015 |
| EP | 1323788 | 7/2003 |
| EP | 1915432 | 4/2008 |
| EP | 1879969 | 9/2010 |
| EP | 2736984 | 6/2018 |
| GB | 2575229 A | 3/2018 |
| JP | 55115478 A | 9/1980 |
| JP | 57-090068 A | 6/1982 |
| JP | 60092370 A | 5/1985 |
| JP | S60118767 A | 6/1985 |
| JP | 2008-297446 A | 12/2008 |
| JP | 2011-105818 A | 6/2011 |
| WO | WO00/22055 A1 | 4/2000 |
| WO | WO2006120227 A1 | 11/2006 |
| WO | WO20070022161 A1 | 2/2007 |
| WO | WO2013/019384 A2 | 2/2013 |
| WO | WO2014118330 A1 | 8/2014 |
| WO | WO2018/206774 A1 | 11/2018 |

OTHER PUBLICATIONS

International Search Report dated Jun. 6, 2019 issued in Application No. PCT/EP2019/057910.

International Search Report dated Jun. 6, 2019 issued in Application No. PCT/EP2019/057873.

* cited by examiner

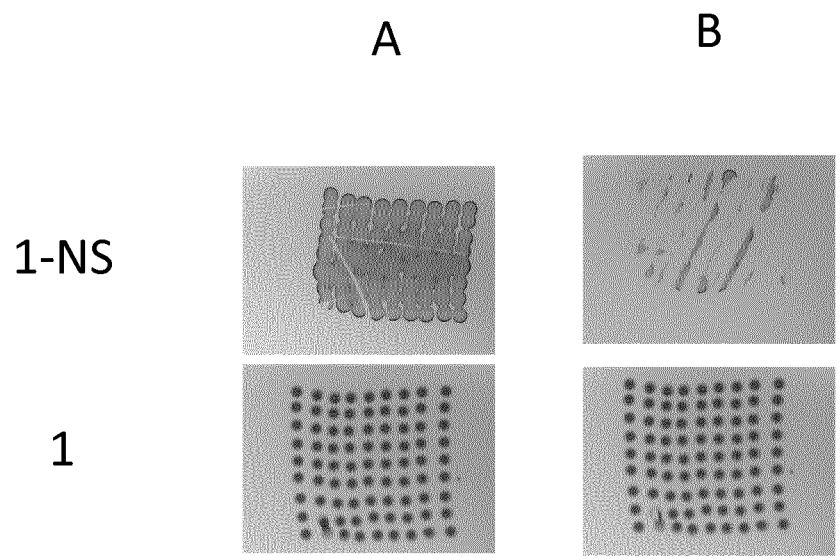
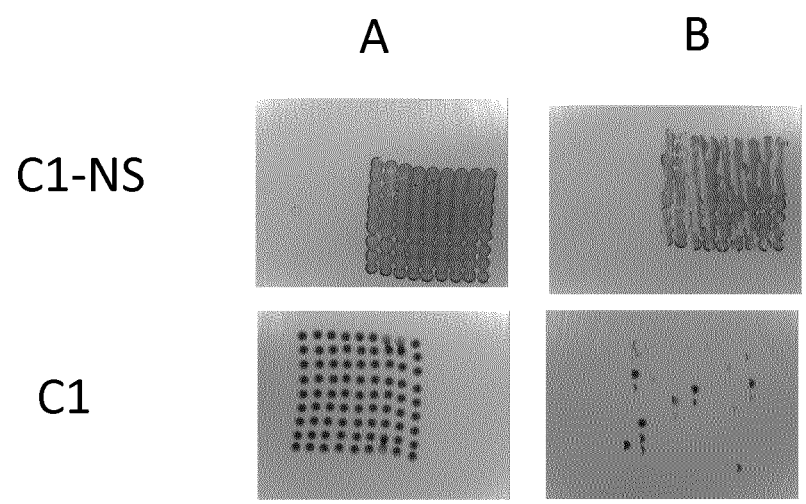

INK COMPOSITION FOR INKJET PRINTING

CROSS REFERENCE TO RELATED APPLICATIONS

This application is a § 371 National State Application of PCT/EP2019/057873 filed Mar. 19, 2019 which claims priority to GB 1804959.3 filed Mar. 28, 2018.

FIELD OF THE INVENTION

This invention relates to an ink composition, in particular an ink composition for use in continuous inkjet printing.

BACKGROUND TO THE INVENTION

EP 1 879 969 is concerned with ingestible ink compositions for use in continuous inkjet printing directly onto foodstuffs and pharmaceuticals. These ink compositions comprise a liquid carrier, a colourant, a siloxane surfactant and, where these components would not provide sufficient electrical conductivity for continuous inkjet printing, a metal conductivity salt.

The siloxane surfactant is present in an amount of 0.1% by weight of the ink compositions of EP 1 879 969 and is stated to be for the purpose of modifying and regulating the surface tensions of the ink compositions.

EP 1 879 969 does not mention using the ingestible ink compositions to print on low surface energy substrates such as polypropylene (PP) and high- and low-density polyethylene (HDPE and LDPE), but, given the siloxane surfactant and conductivity salt content of these ink compositions, a person skilled in the art of ink formulation would expect the adhesion of these ink compositions to such low surface energy substrates to be poor.

It is an object of the present invention to provide an ink composition for continuous inkjet printing that has good adhesion to low surface energy substrates.

It is an alternative or additional object of the present invention to provide a commercially useful alternative to known ink compositions.

SUMMARY OF THE INVENTION

The present invention provides an ink composition, in particular an ink composition for use in continuous inkjet printing, having a siloxane surfactant and a metal conductivity salt, which ink composition is suitable for producing printed images with good adhesion to low surface energy substrates, in particular, low energy substrates such as polypropylene, LDPE and HDPE.

Accordingly, in a first aspect, the present invention provides an ink composition comprising a liquid carrier, a colourant, a siloxane surfactant and a metal conductivity salt, wherein the siloxane surfactant is present in an amount greater than 0.1% by weight of the ink composition.

The combination in an ink composition of a siloxane surfactant present in an amount greater than 0.1% by weight of the ink composition and a metal conductivity salt surprisingly allows printed images to be produced on low surface energy substrates, which images have good adhesion to such substrates. This is contrary to the expectation that the adhesion to low surface energy substrates of an ink composition containing a siloxane surfactant and a conductivity salt would be poor.

In another aspect the present invention provides a printed deposit formed using the ink composition of the invention. The printed deposit comprises a colourant, a siloxane surfactant and a metal conductivity salt.

In this way the invention provides an ink composition for producing a printed deposit and a printed deposit, which printed deposit has good adhesion to low surface energy substrates.

The ink composition is compatible with the components of an inkjet printer, and more particularly a continuous inkjet printer. The ink composition is suitable for application directly onto products and/or product packaging to achieve durable printed images.

These and other aspects and embodiments of the invention are described in further detail below.

SUMMARY OF THE FIGURE

FIG. 1 is a set of four pairs of digital microscope photographs of test images:
- 1-NS was printed using an ink otherwise in accordance with the invention but without the siloxane surfactant;
- 1 was printed using an ink in accordance with the invention. This is the same ink as in 1-NS except in this case the ink has the siloxane surfactant;
- C1-NS was printed using a comparative ink using a non-metal conductivity salt instead of the metal conductivity salt and without the siloxane surfactant; and
- C1 was printed using the comparative ink with a siloxane surfactant. This is the same ink as in C1-NS except in this case the ink has the siloxane surfactant.

The left hand one of each pair of photographs (A) being taken before, and the right hand one (B) after, a tape removal adhesion test on HDPE.

DETAILED DESCRIPTION OF THE INVENTION

The invention provides an ink composition including a liquid carrier, a colourant, a siloxane surfactant and a metal conductivity salt, wherein the siloxane surfactant is present in an amount greater than 0.1% by weight of the ink composition. The liquid carrier may be in the form of an organic solvent.

The presence of the metal conductivity salt enables low conductivity colourants, such as non-ionic dyes and pigment dispersions, to be used in the ink compositions of the invention.

Low conductivity in this context means that the colourant alone does not provide the electrical conductivity required for continuous inkjet printing. That is to say, where the colourant of the ink composition of the invention is a low conductivity colourant, in the absence of the metal conductivity salt, the ink composition of the invention would have insufficient electrical conductivity for use in continuous inkjet printing.

Preferably the ink composition described herein has a viscosity of about 0.5 to 8 mPa·s, more preferably from 1 to 6.5 mPa·s and even more preferably from 2 to 5.5 mPa·s at 25° C. Preferably the ink composition described herein has a viscosity of less than 7 mPa·s, more preferably less than 5.5 mPa·s at 25° C. Preferably the ink composition described herein has a viscosity of greater than 0.5 mPa·s, more preferably greater than 1 mPa·s, even more preferably greater than 3 mPa·s at 25° C. The viscosity of the ink composition may be in a range with the upper and lower limits selected from the amounts described above. The viscosity of the ink composition may be measured using a viscometer such as a Brookfield DV-II+ viscometer.

Preferably the ink composition as described herein has a static surface tension of from 20 to 50 mN/m, more preferably from 20 to 40 mN/m at 25° C., most preferably from 20 to 30mN/m. The static surface tension of the composition may be measured using equipment such as a du Nouy ring tensiometer or using the pendant drop method on a KSV Cam 200 optical tensiometer. The static surface tension of the ink composition may alternatively be measured using a bubble pressure tensiometer, such as a SITA pro line t15.

Colourant

The ink composition and the printed deposit comprise a colourant. The colourant is not particularly limited and any suitable colourant known in the art may be used.

In some embodiments, the colourant may be a low conductivity colourant. Where the colourant is a low conductivity colourant, for example a non-ionic dye or a pigment dispersion, the electrical conductivity of the ink composition in the absence of the metal conductivity salt is less than 300 µS/cm, and preferably less than 200 µS/cm, at 25° C.

The electrical conductivity of the ink composition in the absence of the metal conductivity salt may be measured using an EDT Series 3 BA 380 conductivity meter using an EDT E8070 Polymer Conductivity Cell probe, with the sample warmed by a water bath at a temperature of 25° C.

Where the colourant is a low conductivity colourant, in the absence of a metal conductivity salt the ink composition may be non-conductive because the low conductivity colourant is non-conductive. For example, the low conductivity colourant may be non-ionic (i.e. completely uncharged).

In some embodiments, the colourant is a non-ionic colourant, for example a non-ionic dye or a pigment. For example, it may be a completely uncharged dye such as Solvent Blue 104. Preferably the colourant is a pigment. The pigment may be in the form of a dispersion in the composition. The pigment may be an inorganic or an organic pigment.

The term 'non-ionic' as used herein refers to substances that are not ions and do not dissociate into ions in solution. That is, the term 'non-ionic' refers to substances which are not salts and contain no formal charge.

Where the colourant is a low conductivity colourant, in the absence of a metal conductivity salt the ink composition may have a low level of conductivity because the low conductivity colourant is an ionic complex with low dissociation in the liquid carrier. Low dissociation in this context means that the electrical conductivity of the ink composition in the absence of the metal conductivity salt is less than 300 µS/cm, or preferably less than 200 µS/cm, at 25° C.

In some embodiments, the colourant is a pigment in the form of an ionic complex with low or no dissociation in the liquid carrier. For example, it may be Pigment Blue 15:2, which is an ionic complex with low or no dissociation in most liquid carriers.

In other embodiments, the colourant is an ionic dye with good dissociation in the liquid carrier, but the colourant is present in a sufficiently low concentration that, in the absence of a metal conductivity salt, the electrical conductivity of the ink composition is less than 400 µS/cm, preferably less than 300 µS/cm, and more preferably still less than 200 µS/cm.

It will be appreciated that a dispersion of a conductive pigment, such as carbon black, may constitute a low conductivity colourant if a dispersant and/or solvent forming part of the dispersion hinders electrical contact between the particles of the pigment.

Preferably, an ink composition comprising a low conductivity colourant has a conductivity in the absence of the metal conductivity salt of less than 400 µS/cm at any concentration. More preferably, such an ink composition has a conductivity in the absence of the metal conductivity salt of less than 300 µS/cm, for example, less than 200 µS/cm and most preferably less than 100 µS/cm.

In some cases, the colourant is present in the ink composition at between 1 to 25 wt % based on total weight of the ink composition, more preferably 1.3 to 15 wt %, and most preferably 2 to 7 wt % based on total weight of the ink composition.

An ink composition where the colourant is a low conductivity colourant and without a metal conductivity salt has a conductivity of less than 400 µS/cm when the colourant is present in these amounts. More preferably, the ink composition without the metal conductivity salt has a conductivity of less than 300 µS/cm, for example, less than 200 µS/cm and most preferably less than 100 µS/cm.

Preferably, an ink composition where the colourant is a low conductivity colourant and without a metal conductivity salt has a conductivity of less than 400 µS/cm when the colourant is present in the ink composition at around 3 wt % based on total weight of the ink composition. More preferably, the ink composition without the metal conductivity salt has a conductivity of less than 300 µS/cm, for example, less than 200 µS/cm and most preferably less than 100 µS/cm.

Preferably the colourant is a low conductivity pigment. The low conductivity pigment may be in the form of a dispersion in the composition. The low conductivity pigment may be an inorganic or an organic pigment.

Preferably, the colourant is a carbon black. The carbon black may be provided as a solid (e.g. powder or bead) or a dispersion formulation (e.g. a dispersion in a solvent).

In this way, the present invention provides a carbon-black ink with good adhesion properties that can be used in coding and marking applications for example on common food packaging materials.

Carbon black may be produced by the incomplete combustion of heavy petroleum products such as FCC tar, coal tar, ethylene cracking tar or by charring organic materials such as wood or bone. Carbon black may be a form of paracrystalline carbon that has a high surface-area-to-volume ratio. Carbon black may contain oxygen complexes (e.g. carboxylic, quinonic, lactonic, phenolic groups and others) absorbed onto the surface of the carbon. In some cases carbon black may be acid-oxidized by spraying acid onto the carbon during the manufacturing process to change the inherent surface chemistry. The amount of chemically-bonded oxygen on the surface area of the carbon black can be increased to enhance performance characteristics.

Many carbon black products are advertised as conductive. Indeed, carbon black is conductive as a dry material. Nevertheless, carbon black may constitute a low conductivity colourant as referred to herein if the carbon black does not provide sufficient conductivity to the ink composition for continuous inkjet printing.

It is proposed that the electrons in carbon black as a dry material are free to move between the particles of the carbon black and provide conductivity, but are not free to move between the particles when the carbon black is suspended in the liquid carrier.

Carbon blacks suitable for the ink composition of the invention include carbon blacks manufactured by Mitsubishi Chemical Corporation, for example, No. 2300, No. 900, MCF 88, No. 33, No. 40, No. 45, No.52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 250R, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; carbon blacks manufactured by Orion, for example, Printex 45, Printex 35, Printex nature, Special Black 350, Special Black 535, Printex 3, Printex 30, Special Black 275; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Suitable pigments for use in yellow ink compositions of the invention include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 139.

Suitable pigments for use in magenta ink compositions of the invention include C.I. Pigment Red 5, C.I. Pigment Red 7, C.I. Pigment Red 12, C.I. Pigment Red 48 (Ca), C.I. Pigment Red 48 8 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 176, C.I. Pigment Red 254, C.I. Pigment Red 255, C.I. Pigment Red 272, C.I. Pigment Red 254, C.I. Pigment Orange 64, and C.I. Pigment Orange 73.

Suitable pigments for use in cyan ink compositions of the invention include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4, C.I. Vat Blue 60, C.I. Pigment Blue 15:2, C.I. Pigment Blue 15:4, C.I. Pigment Green 3, C.I. Pigment Violet 23 and C.I. Pigment Violet 37.

Preferably, the pigment is an organic pigment selected from C.I. Pigment Red 176, C.I. Pigment Red 254, C.I. Pigment Red 255, C.I. Pigment Red 272, C.I. Pigment Red 254, C.I. Pigment Orange 64, C.I. Pigment Orange 73, C.I. Pigment Yellow 83, C.I. Pigment Yellow 138, C.I. Pigment Yellow 139, C.I. Pigment Yellow 151, C.I. Pigment Yellow 154, C.I. Pigment Blue 15:2, C.I. Pigment Blue 15:3, C.I. Pigment Blue 15:4, C.I. Pigment Green 3, C.I. Pigment Violet 23 and C.I. Pigment Violet 37.

Low conductivity organic pigments may be selected from carbon black, polycyclic pigments (for example, phthalocyanine, perylene, perinone, anthraquinone, quinacridone, dioxazine, thioindigo, isoindolinone, and quinophthalone pigments) and azo-pigments.

Suitable dyes include Oil Black 860 (CA. Solvent Black 3), Solvaperm Blue 2B or other Solvent Blue 104 dyes, Orasol Blue 855, Orasol Blue 825 (C.I. Solvent Blue 67), Neptune Blue 722 (C.I. Solvent Blue 4), Oil Blue 613 (C.I. Solvent Blue 5), Savinyl Blue GLS (C.I. Solvent Blue 44), Valifast Blue 2606 (C.I. Solvent Blue 70), Valifast Blue 2620 (C.I. Solvent Blue 44), Millijet Black J10, C.I. Solvent Black 7, 27, 28, 29, 35, 48, 49, C.I. Solvent Blue 35, 38, 44, 45, 79, 98, 100, 129, C.I. Solvent Red 8, 49, 68, 89, 124, 160, 164, C.I. Solvent Yellow 83:1, 126, 146, 162, C.I. Solvent Green 5, C.I. Solvent Orange 97, C.I. Solvent Brown 20, 52, and C.I. Solvent Violet 9, of which Solvaperm Blue 2B and Orasol Blue 855 are preferred low conductivity dyes and C.I. Solvent Black 27 and 29 are preferred ionic dyes with good dissociation in common organic solvents.

Preferably the colourant is present in between 1 to 25 wt % based on total weight of the ink composition, more preferably 1.3 to 15 wt %, and most preferably 2 to 7 wt % based on total weight of the ink composition.

Preferably, the colourant is present in less than 25 wt % based on total weight of the ink composition, more preferably less than 15 wt %, more preferably less than 6 wt% and even more preferably less than 4 wt %. Preferably, the colourant is present in greater than 1 wt % based on total weight of the ink composition, preferably greater than 1.3 wt %, and even more preferably greater than 2 wt %. The colourant may be present in an amount that is in a range with the upper and lower limits selected from the amounts described above.

In this way the ink composition may have the desired opacity and colour.

Metal Conductivity Salt

The ink composition and the printed deposit comprise a metal conductivity salt.

The combination of a metal conductivity salt and a siloxane surfactant present in an amount greater than 0.1% by weight of the ink composition surprisingly results in an improvement to the generally poor adhesion to low surface energy substrates of printed images produced using ink compositions containing a siloxane surfactant and a metal conductivity salt. That is, the combination provides improved adhesion to low surface energy substrates. This reversal of the detrimental effect of the presence of a siloxane surfactant and a metal conductivity salt on adhesion is surprising, in particular given that the reversal is not observed when non-metal conductivity salts are used in an ink composition.

Salts are composed of related numbers of cations (positively charged ions) and anions (negatively charged ions) so that the product is electrically neutral (without a net charge). A metal conductivity salt is a salt in which the cation is a metal cation.

The cation may be a group 1 metal ion (alkali metal ion), such as a cation selected from potassium, lithium or sodium cations. Preferably, the cation is a potassium cation.

The anion may be any suitable anion, for example it may be an organic or an inorganic anion, it may be a monoatomic or polyatomic anion. The anion may be selected from $PF_6^-$, $CN^-$, $Cl^-$, $F^-$, $I^-$, $Br^-$, $SCN^-$, $C_6H_7O_2^-$, $CF_3SO_3^-$ or $NO_3^-$. Preferably, the anion is $PF_6^-$ or $I^-$.

Preferably, the metal conductivity salt is selected from lithium nitrate, lithium triflate, potassium hexafluorophosphate, sodium hexafluorophosphate, potassium sorbate, potassium thiocyanate, sodium thiocyanate, sodium iodide or potassium iodide. More preferably, the metal conductivity salt is potassium hexafluorophosphate and/or potassium iodide.

Preferably, the metal conductivity salt is present at 4.0 wt % or less based on total weight of the ink composition, more preferably 2.0 wt % or less and even more preferably 1.5 wt % or less. Preferably, the metal conductivity salt is present at 0.3 wt % or more based on total weight of the ink composition, preferably 0.5 wt % or more, and even more preferably 0.8 wt % or more. The metal conductivity salt may be present in an amount that is in a range with the upper and lower limits selected from the amounts described above. For example, the metal conductivity salt is present at 0.3 to 4.0 wt % based on total weight of the ink composition.

Preferably, the metal conductivity salt is present in an amount that provides an ink composition with a conductivity of less than 2200 µS/cm, more preferably less than 1900 µS/cm and even more preferably less than 1500 µS/cm. Preferably, the metal conductivity salt is present in an amount that provides an ink composition with a conductivity greater than 200 µS/cm, preferably greater than 500 µS/cm, preferably greater than 800 µS/cm, and even more preferably greater than 1200 µS/cm. The metal conductivity salt may be present in an amount to give a conductivity that is in a range with the upper and lower limits selected from the amounts described above. For example, the ink composition has a conductivity of from 500 to 2200 µS/cm.

Conductivity may be measured using an EDT Series 3 BA 380 conductivity meter using an EDT E8070 Polymer Conductivity Cell probe, with the sample warmed by a water bath at a temperature of 25° C.

Siloxane Surfactant

The ink composition further comprises a siloxane surfactant present in an amount greater than 0.1% by weight of the ink composition.

A siloxane surfactant is a surfactant having a siloxane functional group (i.e. an Si—O—Si linkage).

Preferably, the siloxane surfactant is a polyether modified siloxane surfactant.

Preferably, the siloxane surfactant is present in less than 4.0 wt % based on total weight of the ink composition, more preferably less than 3.0 wt % and even more preferably less than 2.5 wt %. The siloxane surfactant is present in greater than 0.1 wt % based on total weight of the ink composition, preferably greater than 0.2 wt %, preferably greater than 0.3 wt %, preferably greater than 0.5 wt %, preferably greater than 0.7 wt %, and even more preferably greater than 0.9 wt %. Preferably, the siloxane surfactant is present at about 1.0 wt ° A based on the total weight of the ink composition. The siloxane surfactant may be present in an amount that is in a range with the upper and lower limits selected from the amounts described above.

Preferably the siloxane surfactant has a viscosity of about 100 to 3000 mPa·s, more preferably from 500 to 2500 mPa·s, more preferably from 1000 to 2500 mPa·s, and even more preferably from 1500 to 2500 mPa·s at 25 ° C. Preferably the siloxane surfactant has a viscosity of less than 3000 mPa·s, more preferably less than 2000 mPa·s at 25° C.

Preferably the siloxane surfactant has a viscosity of greater than 100 mPa·s, more preferably greater than 500 mPa·s, more preferably greater than 1000 mPa·s, more preferably greater than 1500 mPa·s, even more preferably greater than 1700 mPa·s at 25° C. The viscosity of the siloxane surfactant may be in a range with the upper and lower limits selected from the amounts described above. The viscosity of the siloxane surfactant may be measured using a viscometer such as a Brookfield DV-II+ viscometer.

In some cases, a siloxane surfactant is obtained pre-diluted in a solvent. The viscosity of the siloxane surfactant may refer to the viscosity of the pre-diluted solution or to the siloxane surfactant before dilution. Preferably, the viscosity refers to the siloxane surfactant before dilution, i.e. the viscosity is the viscosity of the siloxane surfactant per se.

Solvents

The liquid carrier of the ink composition may comprise an organic solvent or a mixture of organic solvents. Any organic solvent or mixture which can dissolve the colorant is suitable. A solvent may be selected from ketones, alcohols, esters, glycols, glycol ethers, carbonates or a mixture thereof.

For example, an organic solvent may be selected from acetone, methyl ethyl ketone, methyl propyl ketone, methyl isobutyl ketone, cyclohexanone, ethanol, isopropanol, n-propanol, isobutanol, n-butanol, sec-butanol, methyl acetate, ethyl acetate, n-propyl acetate, isopropyl acetate, n-butyl acetate, isobutyl acetate, t-butyl acetate, n-amyl acetate, isoamyl acetate, isobutyl isobutyrate, ethylene glycol, propylene glycol, 1-methoxy-2-propanol and 1-methoxy-2-propyl acetate, dimethyl carbonate or a mixture thereof.

Preferably, an organic solvent may be selected from acetone, methyl ethyl ketone, ethanol, methyl acetate and ethyl acetate or a mixture thereof. In particular, a combination of methyl ethyl ketone with ethanol, ethanol with ethyl acetate and/or methyl acetate, ethanol with 1-methoxy-2-propanol or acetone with methyl acetate may be used.

Preferably, the organic solvent or mixture of organic solvents is present in the composition between 10 to 95 wt %, more preferably 40 to 90 wt %, and most preferably 70 to 90 wt % by weight based on total weight of the ink composition.

Preferably, the organic solvent or mixture of organic solvents is present in less than 95 wt % based on total weight of the ink composition, more preferably less than 90 wt % and even more preferably less than 85 wt %. Preferably, the solvent is present in greater than 10 wt % based on total weight of the ink composition, preferably greater than 40 wt %, and even more preferably greater than 70 wt %. The solvent may be present in an amount that is in a range with the upper and lower limits selected from the amounts described above.

A preferred organic solvent for use is a ketone, such as methyl ethyl ketone. Preferably, the ketone, such as methyl ethyl ketone, is present from 10 to 90 wt %, more preferably 60 to 87 wt %, and most preferably 75 to 85 wt % based on total weight of the ink composition.

Preferably, the ketone, such as methyl ethyl ketone, is present in less than 90 wt % based on total weight of the ink composition, more preferably less than 87 wt % and even more preferably less than 85 wt %. Preferably, the ketone, such as methyl ethyl ketone, is present in greater than 10 wt % based on total weight of the ink composition, preferably greater than 60 wt %, and even more preferably greater than 75 wt %. The ketone may be present in an amount that is in a range with the upper and lower limits selected from the amounts described above.

When the organic solvent is a mixture, the mixture preferably comprises a ketone with an alcohol such as a $C_{1-6}$ alkyl alcohol or an ester with an alcohol or a ketone with an ester. The alcohol may be a $C_{1-6}$ alkyl alcohol such as isopropanol or ethanol, preferably ethanol. The ester may be a $C_{1-6}$ alkyl $C_{1-6}$ alkanoate such as ethyl acetate or methyl acetate. The ketone may be a $C_{1-6}$ alkyl- a $C_{1-6}$ alkyl ketone, for example acetone or methyl ethyl ketone (MEK).

Preferred mixtures comprise methyl ethyl ketone and ethanol or isopropanol, such as ethanol. In this case, preferably methyl ethyl ketone, is present in less than 90 wt % based on total weight of the ink composition, more preferably less than 80 wt % and even more preferably less than 70 wt %. Preferably, methyl ethyl ketone, is present in greater than 10 wt % based on total weight of the ink composition, preferably greater than 45 wt %, and even more preferably greater than 55 wt %. In this case, preferably, the alcohol is present from 5 to 20 wt %, more preferably 10 to 15 wt %, based on total weight of the ink composition. Preferably, the alcohol is present in less than 20 wt % based on total weight of the ink composition, more preferably less than 15 wt %. Preferably, the alcohol is present in greater than 5 wt % based on total weight of the ink composition, preferably greater than 10 wt %. The methyl ethyl ketone and alcohol may be present in an amount that is in a range with the upper and lower limits selected from the amounts described above.

Preferred mixtures comprise acetone with methyl acetate and/or ethyl acetate, such as methyl acetate and ethyl acetate. In this case, preferably acetone, is present in less than 80 wt % based on total weight of the ink composition, more preferably less than 60 wt % and even more preferably less than 50 wt %. Preferably, acetone, is present in greater than 10 wt % based on total weight of the ink composition, preferably greater than 30 wt %, and even more preferably greater than 40 wt %. In this case, preferably, the ester(s) is present from 5 to 40 wt %, more preferably 10 to 30 wt %, based on total weight of the ink composition. Preferably, the ester(s) is present in less than 30 wt % based on total weight of the ink composition, more preferably less than 25 wt %. Preferably, the ester(s) is present in greater than 5 wt % based on total weight of the ink composition, preferably greater than 15 wt %. The acetone and ester(s) may be present in an amount that is in a range with the upper and lower limits selected from the amounts described above.

Preferred mixtures comprise an alcohol, such as ethanol, with methyl acetate or ethyl acetate, such as ethyl acetate. In this case, preferably the alcohol, such as ethanol, is present in less than 70 wt % based on total weight of the ink composition, more preferably less than 50 wt % and even more preferably less than 40 wt %. Preferably, the alcohol, such as ethanol, is present in greater than 10 wt % based on total weight of the ink composition, preferably greater than 20 wt %, and even more preferably greater than 30 wt %. In this case, preferably, the ester is present from 10 to 70 wt %, more preferably 20 to 50 wt %, based on total weight of the ink composition. Preferably, the ester is present in less than 60 wt % based on total weight of the ink composition, more preferably less than 40 wt %. Preferably, the ester is present in greater than 20 wt % based on total weight of the ink composition, preferably greater than 30 wt %. The alcohol and ester may be present in an amount that is in a range with the upper and lower limits selected from the amounts described above.

Preferred mixtures comprise acetone with an alcohol such as ethanol. In this case, preferably acetone, is present in less than 80 wt % based on total weight of the ink composition, more preferably less than 60 wt % and even more preferably less than 50 wt %. Preferably, acetone, is present in greater than 10 wt % based on total weight of the ink composition, preferably greater than 30 wt %, and even more preferably greater than 40 wt %. In this case, preferably, the alcohol is present from 5 to 40 wt %, more preferably 10 to 30 wt %, based on total weight of the ink composition. Preferably, the alcohol is present in less than 30 wt % based on total weight of the ink composition, more preferably less than 25 wt %. Preferably, the alcohol is present in greater than 5 wt % based on total weight of the ink composition, preferably greater than 15 wt %. The acetone and alcohol may be present in an amount that is in a range with the upper and lower limits selected from the amounts described above.

The ink composition is preferably a non-aqueous composition.

The ink composition may also contain water. For example, if present, water may be present at 10 wt % or less based on the total weight of the ink composition, and preferably water is present at 5 wt % or less.

In the printed deposit the liquid carrier or at least a component of the liquid carrier will have at least partially evaporated. In this case, it may be that no liquid carrier or only trace amounts of liquid carrier are present in the printed deposit.

Binders

A binder, such as a binder resin, may be present in the inkjet composition.

The binder comprises one or more polymers. The binder may be selected from any suitable binder, for example, suitable binders include polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins and mixtures of two or more thereof.

Preferably, the binder is selected from cellulosic resins, acrylic resins, vinyl resins, polyamides, polyesters, polyvinyl (e.g. polyvinyl butyral (PVB)), and polyurethanes. More preferably, the binder is a cellulosic resin. Even more preferably, the cellulosic resin is cellulose acetate butyrate.

Preferably, the binder has a molecular weight, such as a weight average molecular weight (Mw) between 500 and 50,000, more preferably between 1,500 and 50,000, more preferably between 10,000 and 50,000 and even more preferably between 15,000 and 50,000. Preferably, the binder has a molecular weight, such as a weight average molecular weight (Mw) of at least 500, more preferably at least 1,500, more preferably at least 10,000 and even more preferably at least 15,000. Preferably, the binder has a molecular weight, such as a weight average molecular weight (Mw) less than 50,000. The binder has a molecular weight, such as a weight average molecular weight (Mw) that is in a range with the upper and lower limits selected from the amounts described above.

In the ink compositions described below the cellulose binder resin CAB-551-0.1 is used. CAB-551-0.1 is shortened to CAB551 in the following description. In the ink compositions described below the binder Foralyn 110 is used. Foralyn 110 is also referred to as 'Foralyn' in the following description.

Additives

The ink composition and the printed deposit may contain additional components, such as those commonly used in the art.

For example, the ink composition and the printed deposit may further comprise one or more preservatives, humectants, additional surfactants, plasticizers, wetting agents, adhesion promotion additives, biocides and mixtures of two or more thereof.

Humectants

Preferably, the ink composition and the printed deposit further comprise a humectant.

Suitable humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol, dipropylene glycol, polypropylene glycol, glycerol, 1,2,6-hexanetriol, sorbitol, 2-pyrrolidone, 2-propanediol, butyrolacetone, tetrahydrofurfuryl alcohol and 1,2,4-butanetriol and mixtures of two or more thereof. Preferably the humectant is selected from a group consisting of glycerol, tetrahydrofurfuryl alcohol, polypropylene glycol and mixtures of two or more thereof.

Preservatives

Preferably, the ink composition and the printed deposit further comprise a preservative.

Suitable preservatives include sodium benzoate, benzoic acid, sorbic acid, potassium sorbate, calcium sorbate, calcium benzoate, methylparaben and mixtures of two or more thereof. The preferred preservative is sodium benzoate.

The ink composition may comprise up to 2% by weight of preservative based on the total weight of the composition. More preferably, the ink composition comprises up to 1% by weight of preservative based on the total weight of the composition.

Tackifier

Preferably, the inkjet ink composition and the printed deposit further comprise a tackifier.

In some cases the tackifier may be a binder; preferably, when the tackifier is a binder it is used in combination with a co-binder. In some cases, the tackifier is a non-film forming polymer. In some cases, the tackifier may be used in combination with other polymers to produce the desired properties.

Suitable tackifiers include resins such as rosins, terpenes and modified terpenes, aliphatic, cycloaliphatic and aromatic resins, terpene phenolic resins and silicone or mineral oils. Preferably the tackifiers are a terpene phenolic resin and/or an ester of hydrogenated rosin. Most preferably the tackifier is a terpene phenolic resin.

The ink composition may comprise from 0.3 to 10% by weight of tackifier based on the total weight of the composition. More preferably, the ink composition comprises from 1 to 5% by weight of tackifier based on the total weight of the composition.

Adhesion Promoter

Preferably, the inkjet ink composition and the printed deposit further comprise an adhesion promoter.

An adhesion promoter is a substance which acts to promote adhesion of the ink composition to a substrate.

Suitable adhesion promoters are titanium phosphate complex, titanium acetylacetonate, triethanolamine zirconate, zirconium citrate, zirconium propanoate, organosilicon, polyketones binders, polyesters binders, or a ketone condensation resin.

Preferably the adhesion promoter is a titanium phosphate complex or a ketone condensation resin. More preferably, the adhesion promoter is a ketone condensation resin.

Dispersant

Preferably, the ink composition and the printed deposit further comprise a pigment dispersant. Suitable dispersants include ionic and non-ionic dispersants. Preferably the dispersant is an acrylic block co-copolymer.

Types of Packaging

The invention further provides a method for printing images on a substrate comprising directing a stream of droplets of any of the embodiments of the ink composition of the invention onto the substrate and allowing the ink droplets to dry, thereby printing images on the substrate. Preferably, an inkjet printer such as a continuous inkjet printer is used in the method.

The ink composition of the present invention is particularly suitable for printing on non-porous substrates, in particular non-porous low surface energy substrates such as are typically used for food packaging.

Examples of such food packaging include aluminium or steel cans, and pots, retort pouches, and flexible films made from low density polyethylene (LDPE), high density polyethylene (HDPE), polypropylene (PP), PET, nylon or PVdC. Preferably, the substrate is a LDPE, HDPE or PP substrate.

Methods and Uses

The ink compositions are formulated by combining the components using methods known in the art.

The components of the ink composition may be combined by adding the components together and stirring using mechanical agitation. In some cases the components may be added in the following order: solvent, binder, surfactant, additional additives, colourant, dispersion and the conductivity salt.

The present disclosure further provides a method for printing images on a substrate in a continuous inkjet printer comprising directing a stream of droplets of any of the embodiments of the ink composition to a substrate and allowing the ink droplets to dry, thereby printing images on a substrate. Any suitable substrate may be printed in accordance with the invention.

Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc.

Preferably, the ink composition as described herein is suitable for coding and marking, in particular for coding and marking on food packaging. It is particularly preferred that the ink composition is useful for printing on plastic or paper wrappers of food or beverage products, for example for printing the expiration date on such packaging. Advantageously, using the compositions and methods described herein overcomes and/or mitigates at least some of the problems described above, providing an improved quality print.

The invention further provides a printed article comprising an article on which a printed deposit has been formed using the ink composition of the invention.

Definitions

As used herein the term printed deposit refers to the ink composition after it has been printed onto a suitable substrate, and at least partially allowed to dry. That is, the ink composition of the present invention wherein at least some of the liquid carrier has evaporated.

An ink composition may be an inkjet ink composition suitable for use in inkjet printing. The ink composition is typically in the form of a liquid, and typically a solution.

The term $C_{1-6}$ alkyl alcohol refers to any solvent having at least one hydroxyl function group (—OH) and having between 1 and 6 carbon atoms.

A polymer is any substance having a repeat unit and includes: polysaccharides and their derivatives, for example cellulose and its derivatives; addition polymers such as acrylic resins or polyvinyl resins; condensation polymer, for example polyurethanes, polyamide and polyesters; and co-polymers wherein the repeat unit is formed of two or more different compounds, for example of styrene and maleic anhydride.

Extent of Disclosure

Each and every compatible combination of the embodiments described above is explicitly disclosed herein, as if each and every combination were individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each were set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figure described above.

EXAMPLES

The following non-limiting examples further illustrate the present invention.

Viscosity was measured using the Brookfield DV-E viscometer fitted with a UL adaptor. The viscosity was measured with the sample immersed in a water bath at a temperature of 25° C. in a room with a pressure of 1.013 kPa and humidity of 70%.

Conductivity was measured using an EDT Series 3 BA 380 conductivity meter using an EDT E8070 Polymer Conductivity Cell probe. The conductivity was measured with the sample warmed by a water bath at a temperature of 25° C.

Printed Ink Properties

Prior to printing, the inks were filtered through 1 µm filter paper.

Print samples were created using a Domino Ax-Series print sample rig fitted with a 60 µm nozzle. Adhesion of the inks was assessed using a printed image in the form of a 9*9 array of droplets printed onto HDPE, LDPE and PP substrates. The HDPE, LDPE and PP substrates were as follows:

| Substrate | Specification | Supplier |
|---|---|---|
| HDPE | 1.5 mm HDPE 300 sheet, natural | Engineering and Design Plastics Ltd, Cambridge, UK |
| LDPE | 1.5 mm sheet, natural | Engineering and Design Plastics Ltd, Cambridge, UK |
| Polypropylene | 1.5 mm natural sheet | Engineering and Design Plastics Ltd, Cambridge, UK |

The 60 µm nozzle was flushed with the main ink solvent prior to use each time. The substrates were cleaned with paper towels dampened with Ethanol (DEB 100) prior to printing.

Tape Removal Adhesion Tests

Tape removal adhesion tests were performed using both Scotch grade 810 (19.05 mm wide) and ISO 2409 Adhesive Tape supplied by Elcometer adhesive tapes. Scotch grade 810 (19.05 mm wide) is referred to as '810' tape and ISO 2409 is referred to as 'ISO' tape in the following description.

The tests were performed 24 h after printing. The tape removal adhesion tests were carried out at 20 to 25° C. with a relative humidity of 25 to 45%.

Around 10 cm of the tape to be tested was cut from the reel. The tape was applied to the printed image to cover the printed image completely, leaving a tail portion unattached to allow the tape to be removed. The tape was applied so that the tape did not crease or contain air bubbles. A pencil eraser was used to ensure that the tape was in uniform contact with the substrate by pressing the eraser on the centre line of the tape and pressing outwards to each edge, working along the length of the adhered portion of the tape.

The tape was then removed by pulling the unattached tail portion of the tape in a swift motion that combined both a lifting and a pulling action whilst holding the substrate firmly in place. Each test was carried out in triplicate.

The adhesion performance was scored by comparing pairs of digital microscope photographs of the printed images taken before tape application and after tape removal using Matlab software. Each such test was carried out in triplicate.

The Matlab software is used as follows:

1. A digital photograph of the printed image is taken using a Celestron Model 44302-b handheld digital microscope.
2. The digital photograph is transferred to a PC running the Matlab software.
3. The Matlab software finds a threshold value for the binarised digital photograph using Otsu's Method (i.e. level=graythresh(I)).

4. The Matlab software converts the digital photograph to black and white only, i.e., binarises the digital photograph, using the threshold value and filters out artefacts smaller than 10 pixels.
5. The Matlab software calculates the sum of the areas of the remaining features in the filtered binarised digital photograph using the function regionprops.

This process is carried out for the printed image before the tape has been applied and after it has been removed. The sum of the areas of the remaining features after the tape has been removed is deducted from the sum of the areas of the remaining features before the tape was applied.

The percentage of ink removed is calculated as follows:

Percentage ink removed=[(sum of areas before tape applied−sum of areas after tape removed)÷sum of areas before tape applied]×100.

Ink Compositions

Two carbon black pigment dispersions were prepared for use as colourants.

The first dispersion, referred to below as Pigment Dispersion 01, was prepared as follows. 34 wt % of MEK was mixed with 36 wt % of BASF EFKA PX 4320 dispersant using mechanical agitation. Once homogeneous, 30 wt % of Cabot Regal 250R carbon black pigment was added and mixed using a Dispermat AE 01-M1-EX high shear mixer until homogeneous to create a pre-dispersion. The pre-dispersion was milled using an Eiger Torrance lab-scale beads attrition mill loaded 85% with 0.8 mm ceramic beads.

The second dispersion, referred to below as Pigment Dispersion 02, was prepared as follows. 40 wt % of ethyl acetate was mixed with 30 wt % of BASF EFKA PX 4320 dispersant using the Dispermat AE 01-M1-EX high shear mixer. Once homogeneous, 30 wt % of Cabot Regal 250R carbon black pigment was added and mixed using the same high shear mixer until homogeneous to create a pre-dispersion. The pre-dispersion was milled using an Eiger Torrance beads attrition mill loaded 85% with 0.8 mm ceramic beads.

Inks were prepared by addition of the components in the following order with magnetic stirring: solvent, binder, surfactant, colourant and conductivity salt.

The complete inks were shaken on a lab shaker for 30 minutes prior to use.

Invention ink and comparative ink compositions were prepared with the formulations set out in Table 1 below. The amounts of the components are provided as wt % based on the total weight of the ink composition. The solvent is used to make up the balance of the ink composition in each case.

For each invention ink and comparative ink in Table 1 below, there is also a corresponding ink (labelled "NS") which does not contain the siloxane surfactant. For example, "Ink 1" is the same as "Ink 1-NS" except for the presence of the siloxane surfactant Tego Glide 410.

TABLE 1

Invention Ink and Comparative Ink Compositions

| Ink | Salt used | Salt | CAB-551-0.01 | Foralyn 110 | Tego Glide 410 | Pigment Dispersion 01 | Solvent used to make up the formulation to 100 wt. % | Conductivity µS/cm |
|---|---|---|---|---|---|---|---|---|
| 1 | KPF6 | 1.00 | 9.00 | 5.00 | 1.00 | 5.00 | MEK | 1326 |
| 1-NS | KPF6 | 0.98 | 9.00 | 5.00 | 0.00 | 5.00 | MEK | 1347 |
| 2 | NaI | 0.89 | 9.00 | 5.00 | 1.00 | 5.00 | MEK | 908 |
| 2-NS | NaI | 0.80 | 9.00 | 5.00 | 0.00 | 5.00 | MEK | 990 |
| 3 | KSCN | 1.01 | 9.00 | 5.00 | 1.00 | 5.00 | MEK | 1070 |
| 3-NS | KSCN | 1.03 | 9.00 | 5.00 | 0.00 | 5.00 | MEK | 1140 |
| 4 | NaSCN | 1.00 | 9.00 | 5.00 | 1.00 | 5.00 | MEK | 750 |
| 4-NS | NaSCN | 0.99 | 9.00 | 5.00 | 0.00 | 5.00 | MEK | 810 |
| Comp. 1 | TBAPF6 | 1.01 | 9.00 | 5.00 | 1.00 | 5.00 | MEK | 940 |
| Comp. 1-NS | TBAPF6 | 0.98 | 9.00 | 5.00 | 0.00 | 5.00 | MEK | 940 |
| Comp. 2 | TBABr | 1.01 | 9.00 | 5.00 | 1.00 | 5.00 | MEK | 450 |
| Comp. 2-NS | TBABr | 1.01 | 9.00 | 5.00 | 0.00 | 5.00 | MEK | 470 |
| Comp. 3 | TBANO3 | 1.02 | 9.00 | 5.00 | 1.00 | 5.00 | MEK | 620 |
| Comp. 3-NS | TBANO3 | 0.98 | 9.00 | 5.00 | 0.00 | 5.00 | MEK | 620 |

CAB 551-0.01 is a cellulose acetate butyrate product with a low hydroxyl content (1.5%) that is commercially available from Eastman.

Tego Glide 410 is a polyether modified polysiloxane surfactant that is commercially available from Evonik.

Foralyn is an ester of hydrogenated rosin commercially available from Eastman, specifically Foralyn 110.

The salts and solvents used were obtained from Sigma Aldrich and Alfa Aesar.

FIG. 1 shows in the rows labelled 1-NS, 1, C1-NS and C1 pairs of images printed on HDPE substrates using invention ink 1 without the siloxane surfactant, invention ink 1 with the siloxane surfactant, comparative ink 1 without the siloxane surfactant, and comparative ink 1 with the siloxane surfactant, respectively. The left-hand column (labelled A) shows each printed image before application of 810 tape, and the right-hand column (labelled B) shows each printed image after removal of the 810 tape.

Comparison of images 1-NS B and 1 B shows that the presence of the siloxane surfactant in invention ink 1 significantly improved the adhesion of the printed image to the substrate.

Comparison of images C1-NS B and C1 B shows that the presence of the siloxane surfactant in comparative ink 1, on the other hand, significantly reduced the adhesion of the printed image to the substrate.

It will be noted that from a comparison of images 1-NS A and 1 A and C1-NS A and C1 A that the presence of the siloxane surfactant in the invention and comparative inks reduced the spreading of the droplets making up the printed images across the HDPE substrate. This effect appears to be independent of any effect on adhesion.

Tape Removal Adhesion Test Results

Tape removal adhesion tests as described above were carried out for each of the invention inks and comparative inks set out in Table 1 above by printing a printed image using each of the inks on substrates of each type (HDPE, LDPE and PP). Each of the printed substrates was then subjected to the tape removal adhesion test in triplicate, i.e. three printed images were tested on each type of substrate for each ink, and the average of the results calculated for each ink. The results are provided in Table 2 below.

TABLE 2

Tape Removal Adhesion Test Results

| Ink | Salt used | ISO TAPE (% Ink Removed) | | | 810 TAPE (% Ink Removed) | | |
| --- | --- | --- | --- | --- | --- | --- | --- |
| | | HDPE | LDPE | PP | HDPE | LDPE | PP |
| 1 | KPF6 | 13 | 1 | 48 | 11 | 22 | 23 |
| 1-NS | KPF6 | 70 | 90 | 95 | 95 | 90 | 96 |
| 2 | NaI | 35 | 82 | 70 | 61 | 84 | 74 |
| 2-NS | NaI | 86 | 30 | 86 | 90 | 94 | 95 |
| 3 | KSCN | 95 | 94 | 91 | 89 | 99 | 95 |
| 3-NS | KSCN | 99 | 98 | 96 | 99 | 98 | 100 |
| 4 | NaSCN | 80 | 95 | 88 | 78 | 97 | 83 |
| 4-NS | NaSCN | 98 | 100 | 93 | 98 | 100 | 99 |
| Comp. 1 | TBAPF6 | 89 | 100 | 100 | 95 | 100 | 100 |
| Comp. 1-NS | TBAPF6 | 6 | 28 | 26 | 31 | 14 | 58 |
| Comp. 2 | TBABr | | | | 95 | 95 | 95 |
| Comp. 2-NS | TBABr | | | | 5 | 5 | 5 |
| Comp. 3 | TBANO3 | | | | 95 | 95 | 95 |
| Comp. 3-NS | TBANO3 | | | | 20 | 20 | 20 |

The tape removal adhesion test results show a clear improvement in adhesion for invention inks 1 to 4, which include the metal salts potassium hexafluorophosphate (KPF6), sodium iodide (NaI), potassium thiocyanate (KSCN) and sodium thiocyanate (NaSCN), respectively, when the siloxane surfactant is present. Conversely, a marked deterioration in adhesion is seen for comparative inks 1 to 3, which include the non-metal salts tetrabutylammonium hexafluorophosphate (TBAPF6), tetrabutylammonium bromide (TBABr) and tetrabutylammonium nitrate (TBANO3), respectively, when the siloxane surfactant is present.

Metal Conductivity Salt Concentration

The effect of the concentration of the metal conductivity salt was studied.

A range of inks was prepared using the procedure set out above with varying amounts of the metal conductivity salt. The formulations of the inks are set out in Table 3 below.

TABLE 3

Varying Salt Concentration Compositions

| | | Raw materials wt. % | | | | | Solvent used to | |
|---|---|---|---|---|---|---|---|---|
| Ink | Salt used | Salt | CAB-551-0.01 | Foralyn 110 | Tego Glide 410 | Pigment Dispersion 01 | make up the formulation to 100 wt. % | Conductivity μS/cm |
| 5 | KPF6 | 0.31 | 9.00 | 5.00 | 1.00 | 5.00 | MEK | 560 |
| 6 | KPF6 | 0.49 | 9.00 | 5.00 | 1.00 | 5.00 | MEK | 810 |
| 1 | KPF6 | 1.00 | 9.00 | 5.00 | 1.00 | 5.00 | MEK | 1326 |
| 7 | KPF6 | 1.52 | 9.00 | 5.00 | 1.00 | 5.00 | MEK | 1860 |
| 8 | KPF6 | 1.96 | 9.00 | 5.00 | 1.00 | 5.00 | MEK | 2200 |
| 9 | NaI | 0.47 | 9.00 | 5.00 | 1.00 | 5.00 | MEK | 800 |
| 2 | NaI | 0.89 | 9.00 | 5.00 | 1.00 | 5.00 | MEK | 908 |
| 10 | NaI | 1.55 | 9.00 | 5.00 | 1.00 | 5.00 | MEK | 2000 |
| 11 | KSCN | 0.54 | 9.00 | 5.00 | 1.00 | 5.00 | MEK | 1318 |
| 3 | KSCN | 1.01 | 9.00 | 5.00 | 1.00 | 5.00 | MEK | 1070 |
| 12 | KSCN | 1.53 | 9.00 | 5.00 | 1.00 | 5.00 | MEK | 2880 |

Tape removal adhesion tests as described above were carried out on each of the inks. The results of these tests are shown in Table 4 below.

TABLE 4

Varying Salt Concentration Results

| | | ISO TAPE (% Ink Removed) | | | 810 TAPE (% Ink Removed) | | |
|---|---|---|---|---|---|---|---|
| Ink | Salt used | HDPE | LDPE | PP | HDPE | LDPE | PP |
| 5 | KPF6 | 27 | 38 | 22 | 14 | 57 | 39 |
| 6 | KPF6 | 8 | 45 | 6 | 17 | 50 | 21 |
| 1 | KPF6 | 13 | 1 | 48 | 11 | 22 | 23 |
| 7 | KPF6 | 52 | 52 | 86 | 24 | 33 | 89 |
| 8 | KPF6 | 44 | 18 | 82 | 28 | 50 | 84 |
| 9 | NaI | 88 | 81 | 93 | 70 | 87 | 89 |
| 2 | NaI | 35 | 82 | 70 | 61 | 84 | 74 |
| 10 | NaI | 95 | 92 | 99 | 80 | 95 | 88 |
| 11 | KSCN | 95 | 80 | 95 | 71 | 55 | 89 |
| 3 | KSCN | 96 | 94 | 91 | 89 | 99 | 95 |
| 12 | KSCN | 98 | 98 | 90 | 88 | 99 | 88 |

Good adhesion can generally be seen for the invention inks containing KPF6 or NaI, with the best adhesion results for the KPF6 series being seen for invention ink 1 and the best adhesion results for the NaI series being seen for invention ink 2.

In the KSCN series the best adhesion results are seen for invention ink 11.

Surfactant Amount

The effect of the amount of surfactant was studied.

A range of inks was prepared using the procedure set out above with varying amounts of the siloxane surfactant. The formulations of the inks are set out in Table 5 below.

TABLE 5

Varying Surfactant Amount Compositions

| | | Raw materials wt. % | | | | | Solvent used to |
|---|---|---|---|---|---|---|---|
| Ink | Salt used | KPF6 | CAB-551-0.01 | Foralyn 110 | Tego Glide 410 | Pigment Dispersion 01 | make up the formulation to 100 wt. % |
| 13-NS | KPF6 | 1.01 | 9.00 | 5.00 | 0.00 | 5.00 | MEK |
| 14 | KPF6 | 1.01 | 9.00 | 5.00 | 0.06 | 5.00 | MEK |
| 15 | KPF6 | 1.01 | 9.00 | 5.00 | 0.27 | 5.00 | MEK |
| 16 | KPF6 | 1.01 | 9.00 | 5.00 | 0.52 | 5.00 | MEK |
| 17 | KPF6 | 1.00 | 9.00 | 5.00 | 0.72 | 5.00 | MEK |
| 1 | KPF6 | 1.00 | 9.00 | 5.00 | 1.02 | 5.00 | MEK |
| 18 | KPF6 | 0.99 | 9.00 | 5.00 | 2.00 | 5.00 | MEK |

Tape removal adhesion tests as described above were carried out on each of the inks using ISO tape on the LDPE substrate only. The results of these tests are shown in Table 6 below.

TABLE 6

Varying Surfactant Amount Results

| Ink | Tego Glide 410 wt % | ISOPE TAPE (% Ink Removed) | 810 LDPE only |
|---|---|---|---|
| 13-NS | 0.00 | 84 | 95 |
| 14 | 0.06 | 68 | 86 |
| 15 | 0.27 | 60 | 56 |
| 16 | 0.52 | 40 | 23 |
| 17 | 0.72 | 31 | 20 |
| 1 | 1.02 | 10 | 26 |
| 18 | 2.00 | 13 | 11 |

Good adhesion is seen for invention inks 16, 17, 1 and 18, with the best adhesion results being seen for invention inks 1 and 18. Invention inks 16 and 17 can be seen to give similar adhesion results to invention ink 1 when tested using the 810 tape.

Surfactant Type

The effects of different surfactants were studied.

A range of inks was prepared using the procedure set out above with different surfactant types. The formulations of the inks are set out in Table 7 below.

TABLE 7

Different Surfactant Compositions

| | | Raw materials wt. % | | | | Solvent used to |
|---|---|---|---|---|---|---|
| Ink | Surfactant Used | KPF6 | CAB-551-0.01 | Foralyn 110 | Surfactant | Pigment Dispersion 01 | make up the formulation to 100 wt. % |
| 19 | Tego Wet 500 | 1.00 | 9.00 | 5.00 | 1.00 | 5.00 | MEK |
| 20 | BYK 333 | 1.00 | 9.00 | 5.00 | 1.00 | 5.00 | MEK |
| 1 | Tego Glide 410 | 1.00 | 9.00 | 5.00 | 1.00 | 5.00 | MEK |

BYK 333 is a polyether modified polydimethylsiloxane surfactant available from BYK.

Tego Wet 500 is a non-ionic organic surfactant available from Evonik. Tego Wet 500 is silicone free.

Tape removal adhesion tests as described above were carried out on each of the inks. The results of these tests are shown in Table 8 below.

TABLE 8

Different Surfactant Results

| | | ISO TAPE (% Ink Removed) | | | 810 TAPE (% Ink Removed) | | |
|---|---|---|---|---|---|---|---|
| Ink | Surfactant Used | HDPE | LDPE | PP | HDPE | LDPE | PP |
| 19 | Tego Wet 500 | 67 | 48 | 93 | 88 | 83 | 93 |
| 20 | BYK 333 | 23 | 7 | 38 | 20 | 13 | 69 |
| 1 | Tego Glide 410 | 13 | 1 | 49 | 11 | 22 | 23 |

Good adhesion is seen for invention inks 20 and 1, particularly on HDPE and LDPE substrates. The adhesion of ink 19, which contains a surfactant that is not a siloxane surfactant, is disappointing.

Different Colourants

The effects of different colourants were studied.

A range of inks was prepared using the procedure set out above with different colourants. The formulations of the inks are set out Table 9 below.

TABLE 9

Different Colourant Compositions

| Ink | Colourant Used | Salt Used | Raw materials wt. % | | | | | Solvent used to make up the formulation to 100 wt. % | Conductivity µS/cm |
|---|---|---|---|---|---|---|---|---|---|
| | | | Salt | CAB-551-0.01 | Foralyn 110 | Tego Glide 410 | Colourant | | |
| Comp. 4 | Orasol 855 | TBAPF6 | 0.98 | 9.00 | 5.00 | 1.00 | 1.50 | MEK | 977 |
| 21 | Orasol 855 | KPF6 | 0.96 | 9.00 | 5.00 | 1.00 | 1.50 | MEK | 1620 |
| Comp. 5 | Solvaperm blue 2B | TBAPF6 | 0.98 | 9.00 | 5.00 | 1.00 | 1.50 | MEK | 1010 |
| 22 | Solvaperm blue 2B | KPF6 | 1.00 | 9.00 | 5.00 | 1.00 | 1.50 | MEK | 1475 |

Solvaperm Blue 2B is a solvent blue 104 dye that is commercially available from Clariant.

Orasol 855 is a solvent blue 70 dye that is commercially available from BASF SE.

Tape removal adhesion tests were carried out on each of the inks, but instead of using the Matlab software to compare before and after photographs, a simple visual inspection was carried out and the adhesion graded in accordance with the criteria set out in Table 10 below. The resulting gradings are set out in Table 11 below.

TABLE 10

Grading Criteria for Adhesion

| Grading System for Adhesion | |
|---|---|
| Excellent | No ink removed |
| Good | Some dots removed, very easy to read the code |
| Moderate | Code partially removed, possible to read the code |
| Poor | Most dots removed, not possible to read |
| Very Poor | Code completely removed |

TABLE 11

Different Colourant Results

| Ink | Colourant Used | Salt Used | ISO TAPE | | | 810 TAPE | | |
|---|---|---|---|---|---|---|---|---|
| | | | HDPE | LDPE | PP | HDPE | LDPE | PP |
| Comp. 4 | Orasol 855 | TBAPF6 | Poor | Poor | Poor | Poor | Very Poor | Poor |
| 21 | Orasol 855 | KPF6 | Excellent | Excellent | Excellent | Excellent | Excellent | Excellent |
| Comp. 5 | Solvaperm blue 2B | TBAPF6 | very poor | very poor | very poor | very poor | very poor | very poor |
| 22 | Solvaperm blue 2B | KPF6 | Good | Good | Moderate | Good | Good | Good |

The tape removal adhesion test generally shows at least good adhesion for invention inks 21 and 22, which use colourants in the form of solvent dyes. The poor adhesion of comparative inks using the same colourants but a non-metal conductivity salt is striking.

Different Solvents

The effects of different solvents, metal conductivity salts, and pigment dispersions were studied.

A range of inks was prepared using the procedure set out above with different solvents, metal conductivity salts and pigment dispersions. The adhesion promoters Tego Variplus CA and Tytan AP 100 were also included. The formulations of the inks are set out in Table 12 below.

TABLE 12

Different Solvents, Metal Conductivity Salts and Pigment Dispersions Compositions

| Ink | Salt Used | Salt | CAB-551-0.01 | Foralyn 110 | Tego Glide 410 | Pigment Dispersion 02 | Tego Variplus CA | Tytan AP100 | Conductivity µS/cm | Solvent used to make up the formulation to 100 wt. % |
|---|---|---|---|---|---|---|---|---|---|---|
| 23 | KI | 1.52 | 5.00 | 2.00 | 1.00 | 5.00 | 10.00 | 3.00 | 730 | EtOH 56%/ |
| 23-NS | KI | 1.52 | 5.00 | 2.00 | 0.00 | 5.00 | 10.00 | 3.00 | 760 | Ethyl |
| 24 | LiNO3 | 2.06 | 5.00 | 2.00 | 1.00 | 5.00 | 10.00 | 3.00 | 1270 | Acetate 44% |
| 24-NS | LiNO3 | 2.06 | 5.00 | 2.00 | 0.00 | 5.00 | 10.00 | 3.00 | 1320 | |

Tego Variplus CA is a ketone condensation resin available from Evonik.

Tytan AP 100 is a titanium phosphate complex from Borica Company Ltd.

Tape removal adhesion tests as described above were carried out on each of the inks using the Matlab software. The results of these tests are shown in Table 13 below.

TABLE 13

Different Solvents, Metal Conductivity Salts and Pigment Dispersions Results

| Ink | Salt Used | ISO TAPE | | | 810 TAPE | | |
|---|---|---|---|---|---|---|---|
| | | HDPE | LDPE | PP | HDPE | LDPE | PP |
| 23 | KI | 17 | 15 | 20 | 14 | 10 | 29 |
| 23-NS | KI | 20 | 42 | 61 | 32 | 19 | 67 |
| 24 | LiNO3 | 14 | 22 | 2 | 26 | 20 | 23 |
| 24-NS | LiNO3 | 39 | 21 | 53 | 44 | 44 | 64 |

Good adhesion is seen for invention inks 23 and 24, which both use a liquid carrier in the form of a mixture of the organic solvents ethanol and ethyl acetate, and use a metal conductivity salt in the form of potassium iodide and lithium nitrate, respectively.

The invention claimed is:

1. An ink composition comprising a liquid carrier, a colorant, a siloxane surfactant and a metal conductivity salt, wherein the siloxane surfactant is present in an amount greater than 0.1% by weight of the ink composition,
   wherein the siloxane surfactant comprises a polyether modified siloxane surfactant, and
   wherein the ink composition has a conductivity of less than 500 µS/cm without including a conductive contribution from the metal conductivity salt.

2. The ink composition of claim 1, wherein the liquid carrier comprises at least one organic solvent.

3. The ink composition of claim 2, wherein the at least one organic solvent comprises at least one of methyl ethyl ketone, acetone and ethanol.

4. The ink composition of claim 2, wherein the at least one organic solvent comprises a mixture of ethanol and ethyl acetate, or a mixture of ethanol and methyl ethyl ketone, or a mixture of acetone, methyl acetate and ethyl acetate.

5. The ink composition of claim 1, wherein the colorant comprises a carbon black.

6. The ink composition of claim 5, wherein the colorant comprises a dispersion of the carbon black.

7. The ink composition of claim 1, wherein the siloxane surfactant is present in an amount of at least 0.3% by weight of the ink composition.

8. The ink composition of claim 1, wherein the metal conductivity salt comprises a salt of a Group 1 metal.

9. The ink composition of claim 8, wherein the metal conductivity salt comprises at least one selected from the group consisting of lithium nitrate, lithium triflate, potassium hexafluorophosphate, sodium hexafluorophosphate, potassium sorbate, potassium thiocyanate, sodium thiocyanate, sodium iodide or potassium iodide.

10. The ink composition of claim 9, wherein the metal conductivity salt comprises at least one of potassium hexafluorophosphate and potassium iodide.

11. The ink composition of claim 1, wherein the metal conductivity salt is present in an amount of 0.3 to 4.0% by weight of the ink composition.

12. A printing method comprising the steps of depositing an ink composition according to claim 1 onto a substrate, and permitting at least partial evaporation of at least a component of the liquid carrier.

13. The printing method of claim 12, wherein the step of depositing the ink composition onto the substrate comprises ejecting droplets of the ink composition from an inkjet print head onto the substrate.

14. An article marked with a printed deposit using the method of claim 12.

15. The ink composition of claim 1, wherein the composition is a continuous inkjet ink composition.

* * * * *